United States Patent [19]
Naber

[11] 3,715,605
[45] Feb. 6, 1973

[54] CONTROL CIRCUIT FOR SINGLE STROKE ELECTRICAL TOOLS

[76] Inventor: John S. Naber, Route 1, Box 264, Marengo, Ill. 60152

[22] Filed: April 12, 1972

[21] Appl. No.: 243,299

Related U.S. Application Data

[63] Continuation-in-part of Ser. No. 833,321, June 16, 1969.

[52] U.S. Cl.............................307/246, 307/252 UA
[51] Int. Cl.................................................H03k 17/00
[58] Field of Search............307/246, 252 UA, 252 N

[56] References Cited

UNITED STATES PATENTS 3,215,864  11/1965  Doyle et al.........................307/246

Primary Examiner—Herman Karl Saalbach
Assistant Examiner—B. P. Davis
Attorney—Richard D. Mason et al.

[57] ABSTRACT

A simplified control circuit for a single stroke electrical tool comprises a first triggerable gate connected in series with the tool across a source of supply. A series circuit including a second gate, a trigger capacitor, and a manually actuated switch is then connected between a trigger terminal of the first gate and a current terminal of the first gate or one of the source terminals. A margin of safety against multiple firing is provided by utilizing the voltage drop developed across the load to develop a reverse charge on the trigger capacitor.

10 Claims, 4 Drawing Figures

CONTROL CIRCUIT FOR SINGLE STROKE ELECTRICAL TOOLS

CROSS REFERENCE TO RELATED APPLICATION

The present application is a continuation in part of application Ser. No. 833,321 filed on June 16, 1969 by the present applicant and assigned to the same assignee as the present application.

This invention relates to a circuit for controlling the energization of a load and, more particularly, to such a circuit for controlling an electrically operated fastener driving tool.

U.S. Pat. No. 3,179,866, assigned to the same assignee as the present application, discloses an electrically operated fastener driving tool that is completely self-contained in the sense that all of the driving components and the power supply therefor are carried on the housing of the tool. This tool includes a fastener driving element or blade actuated by a winding means that is selectively connected to an alternating current potential source for no more than one cycle of the potential by a manually actuated power supply or control circuit carried on the housing. During the momentary energization of the winding, the fastener driving blade is driven through a single power stroke during which the fastener or staple is driven, and the tool cannot be reoperated through an additional power stroke until the manually actuated control means is released and reoperated. This tool is capable of continuous use without excessive heating, provides adequate driving power and is easily controlled in requiring the actuation of only a single switching means.

Control circuits of the type disclosed in the above-mentioned patent generally utilize a trigger capacitor to trigger a silicon controlled rectifier. This capacitor is discharged quickly to prevent a second firing. Occasionally, however, circuits of this type allow a second, and even a third firing to occur. This not only can overload the source of power, but it also can be dangerous to the operator, especially in a machine that automatically reloads itself between firings.

Such circuits also tend to be somewhat bulky, mainly because they usually include in their circuitry electrolytic capacitors having capacity values of 10 microfarads or greater, and oftentimes having capacity values in excess of 100 microfarads. These capacitors are not only expensive and physically large in size, but they also are subject to deterioration with time, and are a frequent cause of malfunction.

A primary object of the present invention is therefore the production of a control circuit that is less expensive, more compact, and more reliable than control circuits currently in use.

A more specific object of the present invention is the production of a control circuit in which a margin of safety is provided against multiple firings.

A further object of the present invention is the production of a control circuit that does not include any large capacity capacitors.

Briefly stated, a control circuit designed in accordance with the present invention develops a charge state on a triggering capacitor which gives positive protection against multiple firings. In a first embodiment of the invention, the voltage developed across a solenoid or other load is used to place a reverse protective charge upon the triggering capacitor during that portion of a half-cycle of supply current when current is supplied to the load. In a second embodiment of the invention, the back E.M.F. developed by a solenoid or other inductive load is used to place a reverse protective charge upon the triggering capacitor during the half-cycle of supply current following the half-cycle when current is supplied to the load. In both embodiments, the final state of charge on the triggering capacitor is such that a positive margin of protection against multiple firing is achieved.

No electrolytic capacitors are required in either embodiment of the invention. A single small triggering capacitor is charged when a firing switch is not actuated and is discharged into the trigger terminal of a main control gate at the start of a half-cycle of the supply when the firing switch is actuated. This trigger capacitor is then charged in the opposite direction so that a margin of safety is provided against multiple firings until the firing switch is de-actuated.

The complete circuit includes a first or main triggerable gate connected in series with a solenoid or other load across a source of alternating current potential; and a trigger capacitor that is connected in series with a manual firing switch and a second, synchronized gate between a trigger terminal of the first gate and either a current terminal of the gate or one of the supply terminals. In the first embodiment, one end of the series circuit which includes the trigger capacitor is connected to one end to the node common to both the first gate and the load, and at the other end by resistors or other circuit elements to the trigger terminal of the first gate and to the supply terminal which connects the load. In the second embodiment, the series circuit which includes the trigger capacitor is connected between the trigger terminal of the first gate and the supply terminal which connects to the load. In both embodiments, a synchronized source of pulses are supplied to the second gate at the onset of positive half cycles, and means are provided for charging the trigger capacitor when the firing switch is not actuated.

In the first embodiment, the circuit element connected in series with the gate control input helps prevent triggering of the gate before the trigger capacitor applies a substantial voltage to the circuit element. A feedback resistor may also connect the trigger terminal of the first gate to the input of the second, synchronized gate. This resistor applies additional reverse bias current to the trigger terminal of the first gate, improves the circuit triggering sensitivity, and renders the circuit relatively insensitive to changes in the values of components.

Preferably the manual switch is a single pole, single throw switch connecting one end of the trigger capacitor to a current terminal of the first triggerable gate or to one of the supply terminals. Charging current for the trigger capacitor can then flow through a resistor connected between this same end of the trigger capacitor and a charging current source. Under certain circumstances, however, a single pole double throw switch is preferably used to alternately switch the trigger capacitor between the source of charging current and the current or supply terminal.

The only capacitor in the control circuit is the trigger capacitor, which need only be large enough to supply a trigger current pulse to the triggerable gate. Typically, this capacitor will have a value of 0.1 or 0.2 microfarads. Thus, electrolytic capacitors are not required, and the maintenance, cost, and packaging problems created by electrolytic capacitors do not arise. The resulting circuit is simple, reliable and inexpensive. After each firing of the triggerable gate, the trigger capacitor is fully discharged and is supplied with a charge in the reverse direction. Since a trigger capacitor charge in excess of ten volts is normally required to trigger the circuit a second time, the small size of this capacitor provides an additional safety margin against possible multiple firings which might otherwise be caused by noise pulses, improper tolerances, or faulty switch contacts.

Further objects, features, and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which.

Figure 1:
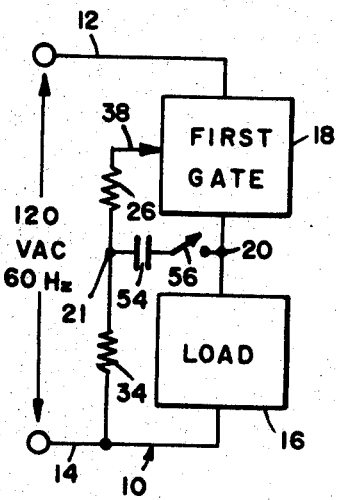
FIG. 1 is a simplified block diagram of a controller circuit designed in accordance with the first embodiment of the present invention.

Referring now to FIG. 1, there is shown a simplified block diagram of a control circuit designed in accordance with the first embodiment of the present invention and indicated by the reference numeral 10. The control circuit 10 is energized by a source of a 120 volt AC, 60HZ current which is supplied to two supply nodes 12 and 14. Connected between the supply nodes 12 and 14 is a series circuit comprising a first triggerable gate 18 connected in series with a solenoid or load 16. The node 20 common to both of these elements is called the common node. A trigger node 21 is connected to a gate or control terminal 38 of the first gate 18 by a diode or resistor 26 (if a diode is used, its anode is adjacent to the trigger node 21, as shown with dashed lines in FIG. 3). The trigger node 21 is also connected to the supply node 14 by a resistor 34. The two nodes 20 and 21 are connected together by a series circuit that includes a trigger capacitor 54 and a switch 56.

The gate 18 is assumed to be a silicon controlled rectifier, a silicon controlled switch, a thyratron, or some equivalent form of triggerable gating device or circuit. While triggerable gates of this type come in a variety of types and polarities, it will be assumed for purposes of discussion that the gate 18 is of a type such that a positive current supplied to the control terminal 38 causes the gate 18 to conduct, but only when the supply node 12 is positive with respect to the common node 20.

Initially the switch 56 is open, and the first gate 18 is non-conducting. No current flows through the load 16 and negligible current flows through the resistors 34 and the resistor or diode 26, and the control terminal 38 is at approximately the same potential as the supply node 14. No current flows into the control terminal 38. The use of a diode for element 26 further resists current flow into the control terminal 38, since any such current has to overcome the junction potential of the diode before it can flow into the control terminal 38. Thus, the gate 18 remains non-conductive. The trigger capacitor 54 is assumed to be initially charged by any convenient charging means, so that the end of the capacitor 54 connected to the trigger node 21 is charged positively with respect to the end of the capacitor 54 connected to the switch 56. If the switch 56 is now closed at the start of a half cycle when the supply node 12 is positive with respect to the supply node 14, a positive current flows through the loop comprising the resistor or diode 26, the control terminal 38, the gate 18, the switch 56, and the capacitor 54. This current triggers the first gate 18 and causes it to connect the common node 20 to the supply node 12. In this manner, a positive half cycle of potential is impressed upon the load 16.

While this positive half cycle is impressed across the load 16, the capacitor 54 is charged oppositely from its initial charge by current flowing through the resistor 34. Thus, at the end of the positive half cycle, the capacitor 54 is left with a reverse negative charge which tends to hold the trigger node 21 negative with respect to the common node 20.

During the negative half cycle which follows, the gate 18 ceases to conduct, the flow of current to the load 16 stops, and the negative potential developed across the capacitor 54 disappears, leaving the capacitor 54 essentially discharged. When once again the supply node 12 goes positive with respect to the supply node 14, the trigger capacitor 54 cannot supply any further current to the control terminal 38. Since it takes a substantial potential across the capacitor 54 to force enough current through the resistor or diode 26, a potential margin against multiple firing of the gate 18 is provided.

Figure 2:
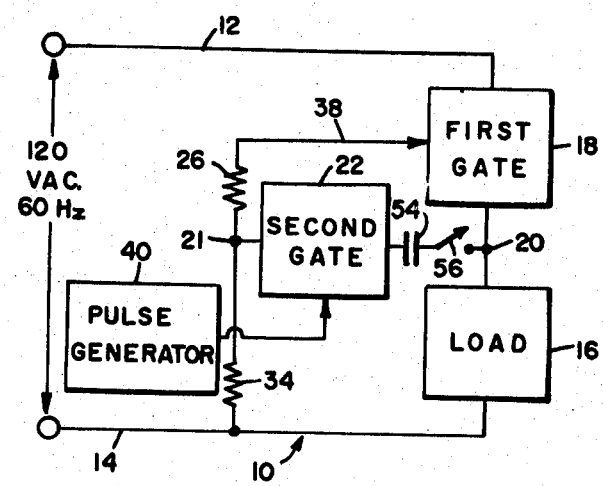
FIG. 2 is a simplified block diagram of a controller circuit designed in accordance with the first embodiment of the present invention and including synchronization means.

FIG. 2 shows the control circuit 10 in more detail, and in particular includes those elements of the circuit 10 which synchronize the discharge of the trigger capacitor 54 with the leading edge of a positive half cycle of the supply current. In particular, a second gate 22 and a positive half cycle leading edge pulse generator 40 are added to the circuit 10. The second gate 22 is connected in series with the trigger capacitor 54 and the switch 56. This second gate 22 prevents the trigger capacitor 54 from discharging and supplying current to the control terminal 38 of the first gate 18 until the leading edge of a positive half cycle. The second gate 22 is enabled only when the pulse generator 40 is generating a positive pulse. The pulse generator 40 is arranged to generate a narrow positive pulse whenever the supply node 12 goes positive with respect to the supply node 14. The details of the pulse generator 40 are disclosed below in the discussion concerning FIG. 3. The switch 56 may be thrown at any time, and does not need to be thrown at the start of a positive half cycle. The second gate 22 prevents a closure of the switch 56 from having any effect until the proper time.

Figure 3:
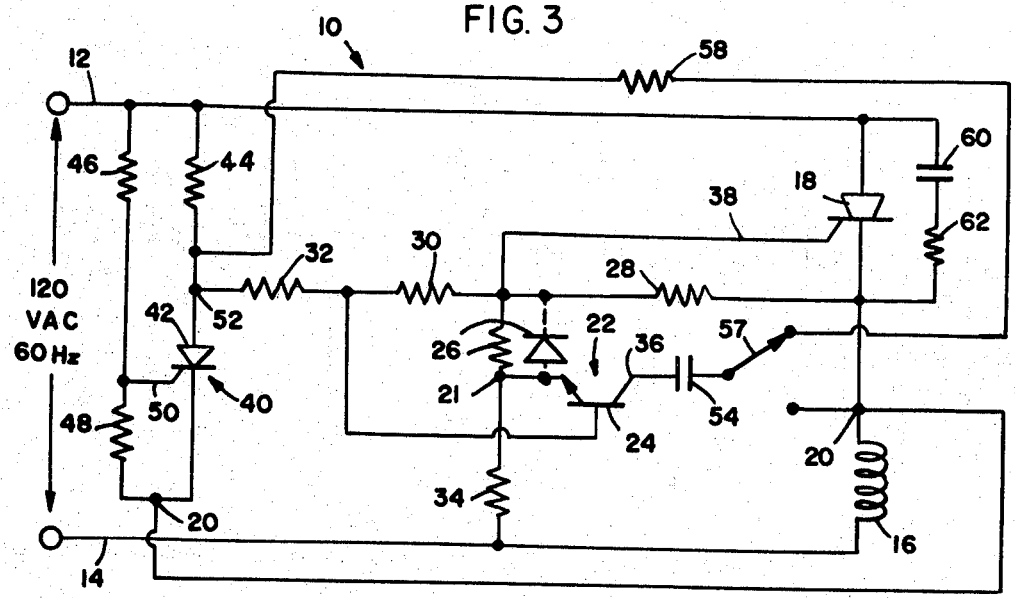
FIG. 3 is a complete schematic diagram of a controller circuit designed in accordance with the first embodiment of the present invention.

Referring now to FIG. 3, there is shown a complete schematic diagram of the control circuit 10. The first gate 18 is a conventional silicon controlled rectifier. The load 16 is shown as an inductance or solenoid. This would typically be the case, since most tools of this type are solenoid actuated. The second gate 22 comprises a transistor 24 having its emitter electrode connected to the trigger node 21, its base electrode connected to the pulse generator 40, and its collector electrode 36 connected to the trigger capacitor 54. A single pole double throw (SPDT) switch 57 replaces the single pole single throw (SPST) switch 56 of FIGS. 1 and 2. As will be explained in more detail below, a single pole single throw (SPST) switch can also be used to trigger the circuit.

The pulse generator 40 comprises basically a silicon controlled rectifier 42 connected in series with a resistor 44. This series circuit is connected between the supply node 12 and the common node 20, as shown. The control terminal 50 of the silicon controlled rectifier 42 is connected to the common node 20 by a resistor 48 and to the supply node 12 by a resistor 46. A node 52 is the node common to both the resistor 44 and the controlled rectifier 42 and is connected to the second gate 22 by a resistor 32.

Assuming for the moment that the triggerable gate 18 is nonconductive, no current flows through the load 16, and the common node 20 is at the same potential as the supply node 14. The pulse generator 40 can thus be thought of as connected directly between the supply nodes 12 and 14. When the supply node 12 is negative with respect to the supply node 14, the controlled rectifier 42 is reverse biased and does not conduct. Since the node 52 is connected to the supply node 12 by the resistor 44, the node 52 goes negative along with the supply node 12. This large negative potential is used to charge the trigger capacitor 54, as will be explained below. When the supply node 12 again goes positive with respect to the supply node 14, initially the controlled rectifier 42 remains unconductive, and the node 52 goes positive along with the node 12. This positive voltage at the node 52 causes a current to flow through the resistor 32 and into the gate 22. This current actuates the gate 22 by causing a transistor 24 to conduct. This current is allowed to flow for only a brief time, however, because soon the potential of the node 12 goes far enough positive so that current through the resistor 46 flows into the control terminal 50 and triggers the controlled rectifier 42 into conduction. This effectively connects the node 52 to the node 20 and thus cuts off the flow of current through the resistor 32. The values of the resistors 46 and 48 are chosen to cause conduction in the controlled rectifier 42 at the proper time. Thus, a positive potential appears at the node 52 and enables the gate 22 for only a short period immediately following the leading edge of a positive half cycle of supply current.

The trigger capacitor 54 is recharged whenever the switch 57 is in the position shown in FIG. 3. During negative half cycles when the supply node 14 is positive with respect to supply node 12, current flows from the supply node 14, through the load 16, the resistors 28 and 30, and the base-collector junction of the transistor 24 to the trigger capacitor 54. Simultaneously current flows out of the trigger capacitor 54, through the switch 57, a resistor 58, and the resistor 44 to the supply node 12. This current charges the trigger capacitor 54 and leaves it with a large negative charge.

As mentioned above, a single pole single throw switch can be used in place of a single pole double throw switch 57, if desired. The switch is connected between the capacitor 54 and the node 20, as shown in FIG. 2. The resistor 58 (FIG. 3) is then connected directly to the end of the capacitor 54 adjacent the switch. When the switch is closed to initiate a discharge, the switch shorts the resistor 58 to the common node 20 and thus prevents the capacitor 54 from recharging until the switch is opened. The single pole single throw configuration gives entirely satisfactory results. However, when the invention is used in a tool that recoils, it has been found that certain types of switches have contacts which open when the tool recoils, thereby permitting the capacitor 54 to recharge prematurely. With such a recoil sensitive switch the single pole double throw configuration is preferable, since it gives more protection against multiple firing.

The resistors 30 and 32 form a voltage divider which couples the positive pulses from the node 52 to the base of the transistor 24. By connecting the resistor 32 to the control terminal 38 rather than to the common node 20, positive feedback is achieved which makes the selection of values for the resistor 34 and for the resistor or diode 26 much less critical. When the gate 18 is nonconductive, the control terminal 38 can be considered to be short-circuited to the common node 20 by the low impedance resistor 28. However, when the gate 18 is conducting heavily, the control terminal 38 goes positive with respect to the common node 20. This positive voltage causes current to flow through the resistor 30 and into the base of the transistor 24. This current adds to the current flowing through the resistor 32 from the pulse generator 40 and thus represents positive feedback. The positive feedback is further enhanced by the fact that the emitter of the transistor 24 is driven negative with respect to the common node 20 by the voltage drop which appears across the load 16, as is explained above. If the element 26 is a diode, the emitter of the transistor 24 is effectively decoupled from the trigger node 38 once the trigger capacitor 54 is discharged and allows current flow through the resistor 34 to further discharge the capacitor 54. All of these elements in combination produce a circuit that has a high trigger sensitivity, an ability to fully discharge the trigger capacitor 54, and yet a circuit which operates properly even though some of the components may be out of tolerance. The resistors 30 and 32 must have a high enough resistance so that the positive pulses generated at the node 52 do not trigger the triggerable gate 18 when it is in its most sensitive condition.

The series circuit comprising a resistor 62 and a capacitor 60 is connected across the gate 18 to prevent "plug-in" and other line transients from causing misfirings due to a sudden rise in potential across the triggerable gate 18. The resistor element 28 also aids in providing some immunity to misfirings due to line transients.

Assuming now that a suitable supply of current is applied to the supply nodes 12 and 14, initially the trigger capacitor 54 charges up in the manner described above so that the end of the capacitor adjacent the switch 57 is negatively charged. When it is desired to supply power to the load 16, the switch 57 is thrown into the opposite position from that shown in FIG. 3. This connects the negative end of the trigger capacitor 54 to the common node 20. The next time the supply lead 12 goes positive with respect to the supply lead 14, a positive pulse is generated at the node 52 in the manner described above. This positive pulse causes current to flow through the resistor 32, and this current causes the transistor 24 to conduct. The transistor 24 connects the trigger node 21 to the positive side of the trigger capacitor 54. A positive current now flows through the resistor or diode 26 and into the control terminal 38 of the triggerable gate 18. The gate 18 now conducts and connects the load 16 directly across the supply nodes 12 and 14 for the remainder of the positive half cycle.

When the control rectifier 18 is conductive, the voltage which appears across the load 16 also appears across the series combination of resistor 28, resistor or diode 26, and resistor 34. Because of the voltage drop across resistor 28 and resistor or diode 26, the common node 20 is now positive with respect to the trigger node 21. Similarly, since the node 52 is either connected to the supply node 12 by the resistor 44 or else is connected to the common node 20 by the controlled rectifier 42, the node 52 is also positive with respect to the trigger node 21. Current therefore flows through the resistor 32 and keeps the transistor 24 in a conducting state, and simultaneously current flows out of the trigger capacitor 54 and into the common node 21. This current flow completely discharges the trigger capacitor 54 and may leave a residual charge that biases the common node 20 positive with respect to the collector 36 of the gate transistor 22.

At the end of the positive half cycle, the triggerable gate 18 turns off and stops the flow of current to load 16, with the possible exception of a transient current that flows momentarily through the elements 60 and 62. The switch 57 still connects the trigger capacitor 54 to the node 20, but now the trigger capacitor 54 is discharged, and it holds the collector 36 of the transistor 24 at roughly the potential of the common node 20. Thus, no current flows from the trigger capacitor 54 into the control terminal 38 of the rectifier 18. Since it would take at least two volts to overcome the junction potentials of the transistor 24, the diode 26, and the triggerable gate 18, a margin of insurance is provided which insures that the gate 18 does not fire a second time. Ultimately, when the switch 57 is returned to the position shown in FIG. 3, a charging path is reestablished for the trigger capacitor 54, and the capacitor 54 is recharged.

The capacitor 54 need be only large enough to hold sufficient charge to trigger the silicon controlled rectifier 18. In the present embodiment, this capacitor has a value of 0.2 microfarads. The capacitor 60 has a value of 0.1 microfarads. Thus, the circuit 10 is entirely free of any large or cumbersome capacitors. The use of a second gate 22 and a pulse generator 40 obviates the need for an electrolytic capacitor to maintain the silicon controlled rectifier 18 in a conducting state during negative half cycles (see, for example, U.S. Pat. No. 3,414,738). The silicon controlled rectifier pulse generator 40 also supplies a large enough negative potential to the charging current resistor 58 so that the trigger capacitor 54 can be substantially smaller than those previously used (see, for example, U.S. Pat. No. 3,179,866).

The improved operation of the circuit 10 is made possible in part by the positioning of the first gate 18 with respect to the load 16. In conventional circuits, the load 16 would always be connected between the first gate 18 and the supply node 12, rather than between the first gate 18 and the supply node 14. Such prior art arrangements have no way of supplying a reverse current to the trigger capacitor 54 through a resistor such as the resistor 34. The negative current flow through the resistor 34 when the triggerable gate 18 is conducting insures that the trigger capacitor 54 is always fully discharged before the end of the conduction cycle.

The following components are used in the preferred embodiment of the control circuit 10:

| No. | Name of Element | Value |
| --- | --- | --- |
| 18 | silicon controlled rectifier | 2N 3669 |
| 24 | transistor | 2N 4400 |
| 26 | resistor or diode | 47 ohms or 1N 4001 |
| 28 | resistor | 33 ohms |
| 30 | resistor | 3,300 ohms |
| 32 | resistor | 6,800 ohms |
| 34 | resistor | 4,700 ohms |
| 42 | silicon controlled rectifier | 2N 5060 |
| 44 | resistor | 18,000 ohms, 1 watt |
| 46 | resistor | 470,000 ohms |
| 48 | resistor | 15,000 ohms |
| 54 | capacitor | 0.2 microfarad, 100 volts AC |
| 56, 57 | pushbutton switch | SPDT or SPST |
| 58 | resistor | 27,000 ohms |
| 60 | capacitor | 0.1 microfarad, 400 volts AC |
| 62 | resistor | 120 ohms |

Figure 4:
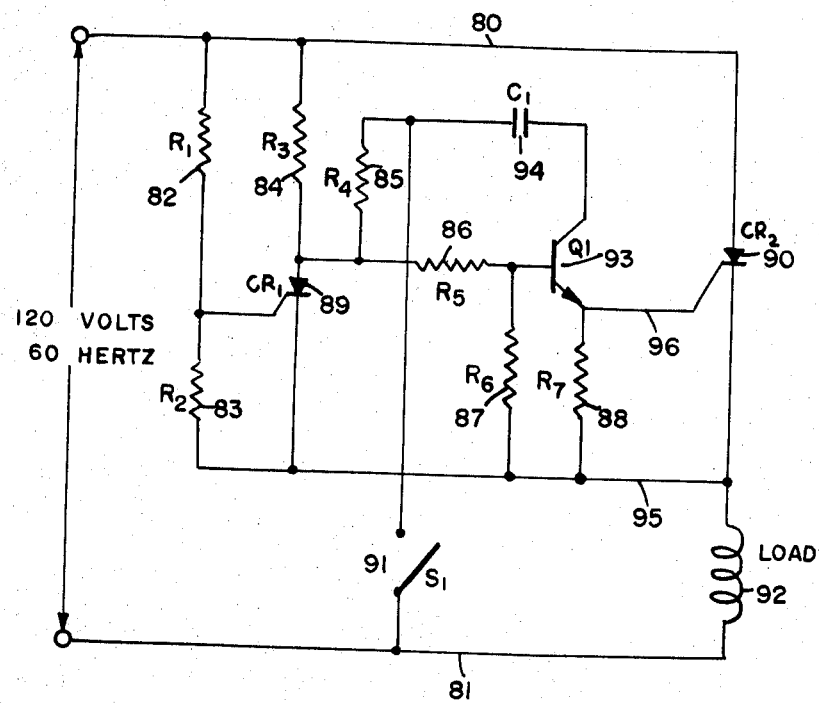
FIG. 4 is a complete schematic diagram of a controller circuit designed in accordance with the second embodiment of the present invention.

A second embodiment of the present invention appears in FIG. 4. Whereas the first embodiment of the invention utilizes the voltage developed across the load during the half cycle of conduction to back bias the trigger capacitor, the second embodiment of the invention utilizes the back electromotive force developed by the inductive load at the end of this half cycle to back bias the trigger capacitor.

In FIG. 4, an inductive load or solenoid 92 is connected in series with a silicon controlled rectifier 90 across a pair of alternating current supply terminals 80 and 81. A node 95 is common to both the cathode of the controlled rectifier 90 and to the load 92. A combined pulse generating circuit and capacitor charging current source comprising the elements 82, 83, 84, and 89 is connected between the supply node 80 and the common node 95. This combined pulse generator and charging current source is identical to that disclosed in FIG. 3 and needs no further explanation.

A trigger capacitor 94 is connected in series with a manually actuated single-pull, single-throw switch 91 and with a transistor switch 93 between the trigger terminal 96 of the controlled rectifier 90 and the supply terminal 81 which connects to the load 92. The emitter of the transistor 93 is connected directly to the trigger terminal 96 of the controlled rectifier 90, and the collector of the transistor 93 is connected to one end of the capacitor 94. The other end of the capacitor 94 is connected to the supply node 81 by the switch 91. The other end of the capacitor 94 is also connected by a resistor 85 to the source of charging current for the capacitor 94. Triggering pulses at the beginning of positive half cycles are supplied to the emitter terminal of the transistor 93 through a resistor 86. Resistors 87 and 88 respectively connect the emitter of the transistor 93 and the trigger terminal 96 of the controlled rectifier 90 to the common node 95, thus protecting the transistor emitter and the controlled rectifier trigger terminal from excessive voltages and simultaneously increasing the amount of current which it takes to cause conduction in either of the switching devices 90 or 93.

Normally the switch 91 is open. During negative half cycles of the alternating current supply (when the node 80 is negative with respect to the node 81), the trigger capacitor 94 is charged by current flowing (from positive to negative) from the supply node 81, through the load 92, along the common node 95, through the resistor 87, through the forward biased base-collector junction of the transistor 93, through the trigger capacitor 94, through the resistor 85, and through the resistor 84 to the supply node 80. Over a number of supply cycles, this current flow builds up a triggering charge upon the capacitor 94. The charge is maintained because the base-collector junction of the transistor 93 does not allow the capacitor 94 to discharge during positive half cycles.

When it is desired to apply a half cycle of power to the load 92, the switch 91 is closed. Excepting the non-conductance of the transistor switch 93, a current path is now established between the triggering capacitor 94 and the trigger terminal 96 of the controlled rectifier 90. At the onset of the next positive half cycle, (the node 80 positive with respect to the node 81) a current pulse passes through the resistor 86 to the emitter of the transistor 93 and renders the transistor 93 conductive. A current flow path is now established from the capacitor 94, through the transistor 93 to the trigger terminal 96, and through the controlled rectifier 90, the load 92, and the switch 91 back into the other end of the capacitor 94. The pulse of current which flows over this path renders the controlled rectifier 90 conductive and causes a complete half cycle of alternating current to be applied to the load 92.

Since the load 92 is inductive, the load develops a reverse electromotive force at the end of the positive half cycle. As the potential of the node 80 swings through zero and goes negative, the load 92 develops and applies a potential to the common node 95 (with respect to the supply node 81) which keeps the controlled rectifier 90 conductive until the common node 95 has swung to a negative potential— for example, 100 volts negative. This reverse voltage developed across the load is a direct result of the decreasing magnitude of current flow through the load. When current flow through the load ceases, this reverse voltage also ceases, and the potential of the common node 95 reverts to the same potential level as the supply node 81. Typically, conduction ceases about one-third of the way through the negative half cycle which immediately follows a positive half cycle of conduction.

The circuit shown in FIG. 4 utilizes this negative voltage developed across the load 92 to apply a reverse charge to the capacitor 94. One end of the capacitor 94 is maintained at the potential of the supply node 81 by the closed switch 91. The other end of the capacitor 94 is connected to the common node 95 by the transistor 93 and by the controlled rectifier 90. Conduction in the transistor 93 is maintained by the fact that the base terminal of the transistor 93 is biased positively with respect to the common node 95 because of current which flows through the switch 91, the resistor 85, the resistor 86, and the resistor 87 to the common node 95. A large negative potential is developed across the triggering capacitor 94 during the first portion of the negative half cycle which follows a positive half cycle of conduction.

After the controlled rectifier 90 finally becomes non-conductive, the capacitor 94 is left with a negative bias which slowly bleeds off through the forward-biased base-collector junction of the transistor 93 and through the resistor 87 which connects the transistor base to the common node 95. The capacitor 94 is prevented from recharging because the switch 91 is still closed and thus prevents the flow of current through the resistor 85 into the capacitor 94 during negative half cycles. When the switch 91 is allowed to open, the triggering capacitor 94 is then recharged through the resistor 85 to its normal state of charge, and the circuit is then ready to operate again.

The following components are used in the preferred embodiment of the control circuit 10:

| No. | Name of Element | Value |
| --- | --- | --- |
| 82 | resistor | 470,000 ohms |
| 83 | resistor | 10,000 ohms |
| 84 | resistor | 18,000 ohms |
| 85 | resistor | 27,000 ohms |
| 86 | resistor | 6,800 ohms |
| 87 | resistor | 10,000 ohms |
| 88 | resistor | 120 ohms |
| 89 | silicon controlled rectifier | 2N 5061 |
| 90 | silicon controlled rectifier | C122B (General Electric Co.) |
| 93 | transistor | 2N 5184 |

What is claimed as new and desired to be secured by Letters Patent of the United States is:

1. A control circuit for energizing a load with current from an alternating current supply, said control circuit comprising:

a first gate having a control terminal;

a series circuit including said first gate and said load, and connected across said alternating current supply;

a capacitor means;

a switch having first and second states;

first means including said switch for connecting said capacitor means to said supply so as to develop a first state of charge in said capacitor means when said switch is in its first state;

second means including said switch for connecting said capacitor means to said first gate so that a current flow from said capacitor means produces conduction in said first gate at the start of a half cycle of said supply when said switch is in its second state; and third means including said switch and responsive to current flow through said load for developing a second charge on said capacitor means when said switch is in its second state, the magnitude of said second charge preventing said capacitor means from producing further conduction is said first gate during subsequent half cycles and providing a margin of safety against multiple energizations of said load.

2. A control circuit in accordance with claim 1 wherein the first means comprises a source of charging current connecting said supply to one end of said capacitor means, and in which said switch, when in the second state, connects the one end of said capacitor means to a terminal of the load so as to effectively prevent the source of charging current from charging the capacitor means when said switch is in the second state.

3. A control circuit in accordance with claim 1 wherein the first means comprises a source of charging current connecting said supply to one end of said capacitor means, and in which said switch when in the second state, connects the one end of said capacitor means to a terminal of the supply so as to effectively prevent the source of charging current from charging the capacitor means when said switch is in the second state.

4. A control circuit in accordance with claim 1 wherein the second means comprises a series circuit including said switch and also including a synchronized gate interconnecting the control terminal of the first gate and a terminal of the load, said switch completing said series circuit when in its second state.

5. A control circuit in accordance with claim 1 wherein the second means comprises a series circuit including said switch and also including a synchronized gate interconnecting the control terminal of the first gate and a terminal of the supply, said switch completing said series circuit when in its second state.

6. A control circuit in accordance with claim 1 wherein the third means comprises a loop circuit including said switch, said capacitor means, and said load which loop circuit is completed when said switch is in the second state, whereby potential developed across said load as a result of current flow through said load develops the second state of charge on said capacitor.

7. A control circuit in accordance with claim 1 wherein said switch connects one end of said capacitor means to a node common to said first gate and said load, and conductive means connects the other end of said capacitor means to a node common to said load and to said supply.

8. A control circuit in accordance with claim 1 wherein said switch connects one end of said capacitor to a node common to said load and to said supply, and conductive means connects the other end of said capacitor means to a node common to said first gate and to said load.

9. A control circuit for energizing and inductive load with current from an alternating current supply, said control circuit comprising:
   a first gate having a control terminal;
   a series circuit including said first gate and said load, and connected across said alternating current supply;
   a capacitor means;
   a switch having first and second states;
   first means including said switch for connecting said capacitor means to said supply so as to develop a first state of charge in said capacitor means when said switch is in its first state;
   second means including said switch for connecting said capacitor means to said first gate so that a current flow from said capacitor means produces conduction in said first gate at the start of a half cycle of said supply when said switch is in its second state; and
   third means including said switch when said switch is in its second state for coupling said capacitor means parallelly to said load to permit the inductive potential developed across said load when the flow of current through said load decreases to develop a second charge on said capacitor means, the magnitude of said second charge preventing said capacitor means from producing further conduction in said first gate during subsequent half cycles and providing a margin of safety against multiple energizations of said load.

10. A control circuit for energizing a load with current from an alternating current supply, said control circuit comprising:
    a first gate having a control terminal;
    a series circuit including said first gate and said load, and connected across said alternating current supply;
    a capacitor means;
    a switch having first and second states;
    first means including said switch for connecting said capacitor means to said supply so as to develop a first state of charge in said capacitor means when said switch is in its first state;
    second means including said switch for connecting said capacitor means to said first gate so that a current flow from said capacitor means produces conduction in said first gate at the start of a half cycle of said supply when said switch is in its second state; and
    third means including said switch when said switch is in its second state for coupling said capacitor means parallelly to said load to permit the potential developed across said load when said load is connected to the supply to develop a second charge on said capacitor means, the magnitude of said second charge preventing said capacitor means from producing further conduction in said first gate during subsequent half cycles and providing a margin of safety against multiple energizations of said load.

* * * * *